May 28, 1968 J. P. RICH 3,385,753

STRAINER

Original Filed Oct. 28, 1966 2 Sheets-Sheet 1

May 28, 1968  J. P. RICH  3,385,753
STRAINER
Original Filed Oct. 28, 1966  2 Sheets-Sheet 2
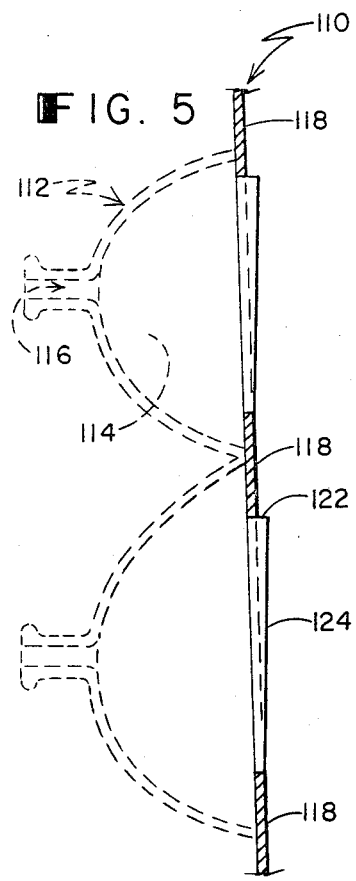
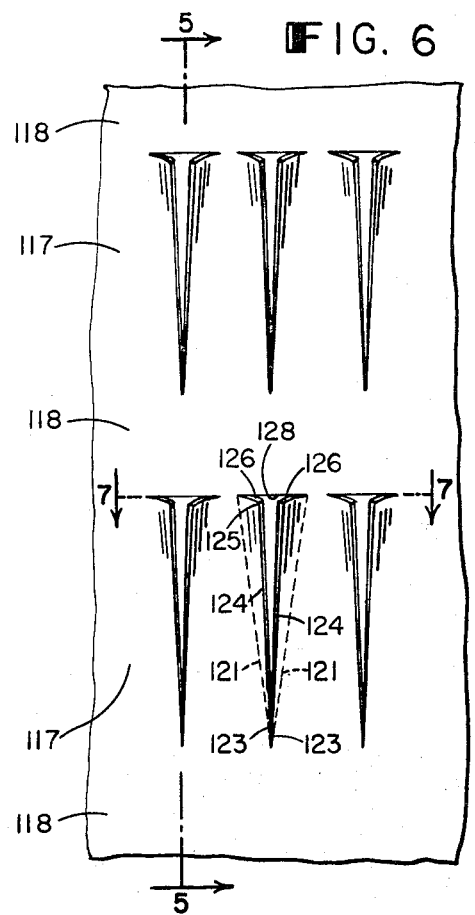
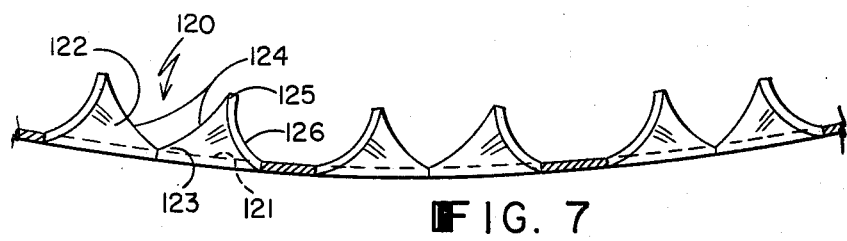

United States Patent Office 3,385,753
Patented May 28, 1968

3,385,753
STRAINER
John Parker Rich, Nashua, N.H., assignor to Improved Machinery Inc., Nashua, N.H., a corporation of Delaware
Continuation of application Ser. No. 590,326, Oct. 28, 1966, which is a continuation-in-part of application Ser. No. 300,213, Aug. 6, 1963. This application May 15, 1967, Ser. No. 638,471
2 Claims. (Cl. 162—251)

ABSTRACT OF THE DISCLOSURE

A strainer of extended axial length especially useful in the separation of liquid from a wood-chip liquid mixture. It includes a vessel with a wall means of increasing cross-sectional area from its inlet to its outlet and having a plurality of slot elements defining narrow slots of increasing width in the direction of the outlet. The inner edges of the slot elements increase in their spacing from one another and at least do not decrease in radius in the direction of the outlet, with the inner edges of each slot element in the outlet direction being outward radially of the next preceding slot element inner edges. This provides an open ended slot of progressively increasing width for advance of a wood-chip or other solid particle without plugging or jamming.

---

This application is a continuation of my pending application Ser. No. 590,326 filed Oct. 28, 1966, now abandoned, which is in turn a continuation-in-part of my pending application Ser. No. 300,213, filed Aug. 6, 1963, now abandoned.

This invention relates to the separation of the components of a solid particle fluid mixture and more particularly to a novel strainer construction therefor especially useful in apparatus for the papermaking industry, for example.

Continuous pulping of wood or other fibrous material is carried out, for example, by digesting particles of fibrous materials such as wood chips in a highly heated liquid chemical solution, preferably under pressure, by feeding the wood chips into one end of a reaction vessel and advancing them toward the other end while treating them so that they will be substantially reduced to pulp by the time they reach the end of the reaction vessel for discharge. This operation, particularly in the case of multiple zone treatment, requires that the liquid be continuously separated from the wood chips both for heating it and in order to replace spent liquid as required. For doing this, the reaction vessel is commonly provided with a peripheral strainer usually consisting of a plurality of slots or holes in the wall of the cylindrical reaction vessel forming a band therearound, the said slots or holes communicating with an annular chamber suitably connected to heaters, fresh liquid chemical supply, etc. However, this type of structure tended to clog because of the tendency of a wood chip partially within and passing along a slot or hole to become lodged therein against the downstream end wall of the slot or hole. When this occurred, successive wood chips tended to pile up behind such a chip and so clog the slot or hole. If this occurred in enough slots or holes to prevent the required flow of liquid therethrough, the apparatus had to be shut down for cleaning. In an attempt to solve this difficulty, various means have been employed, for example, as shown in Patent No. 2,998,064, by providing a strainer structure wherein slots are oriented longitudinally in the reaction vessel and are open at their downstream end in the direction of movement of the wood chips for a depth at least as great as that to which a wood chip may be received in the slot. Thus, if a wood chip enters a slot either entirely or partially, it will either pass through or be moved along the slot by the advancing mass of chips until it passes freely from the end thereof. Although this is a satisfactory solution to the problem in axially short strainers, it does not solve the problem in long strainer sections. This is due to the practical impossibility of providing long strainer bars of sufficient straightness to provide slots having parallel sides throughout their length. Rather, at one or more points such long bars will converge, causing plugging by stopping the advance of the chips along the slot. Nor does a simple flaring structure such as is shown in Patent No. 2,661,095 function effectively in long strainers, since the diverging slots thereof in a short distance become too far apart to prevent the passage of solid particles therethrough.

Accordingly, it is an object of the present invention to provide a non-clogging strainer structure of any desired length, yet of simple and rugged design and construction in order to obviate the above-mentioned problems so that continuous pulping apparatus and other equipment can be operated continuously without the necessity of expensive and time-consuming shutdowns or cumbersome ancillary apparatus for the purpose of unclogging strainers.

It is another object of the invention to provide a treating vessel utilizing radial flow, by utilizing an axially extending central fluid inlet in combination with the stepped slotted wall portions of the invention.

Various other objects and features of the invention will become apparent from the following description of preferred embodiments thereof, taken with the accompanying drawings, wherein:

FIG. 5 is a longitudinal sectional view of the wall of a vessel incorporating the invention in a second embodiment;

FIG. 6 is an elevation of a portion of the wall of the vessel of FIG. 5; and

FIG. 7 is an enlarged horizontal sectional view of a portion of the wall of the vessel of FIG. 5 along the line 7—7 of FIG. 6.

Figure 1:
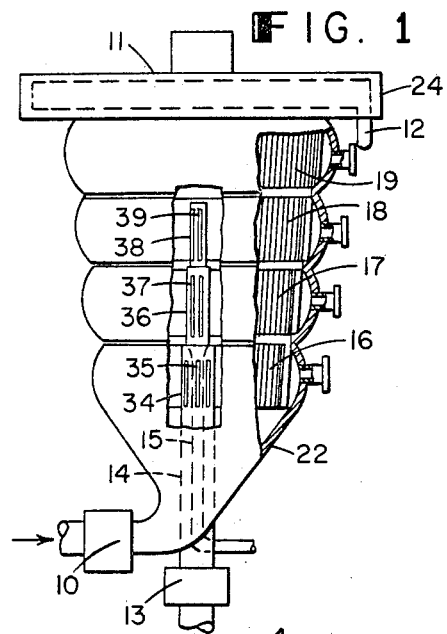
FIG. 1 is an elevation partially broken away and in section showing a portion of a vessel incorporating the invention in a first embodiment.

In the first embodiment referring to the drawings, FIGS. 1-4, the vessel, partially shown in FIG. 1, is shown for a specific example generally upright and of generally cylindrical shape and includes inlet means, including a pump 10 for feeding wood chips, pulp, or the like into the bottom thereof and outlet means including a discharger 11 and outlet pipe 12 for removing pulp from the top, as is well known in the art. A central pipe 14 having an upper portion hereinafter more fully described, extends upwardly from the bottom of the vessel for feeding treating fluid thereinto, as fed by pump 13.

Figure 3:
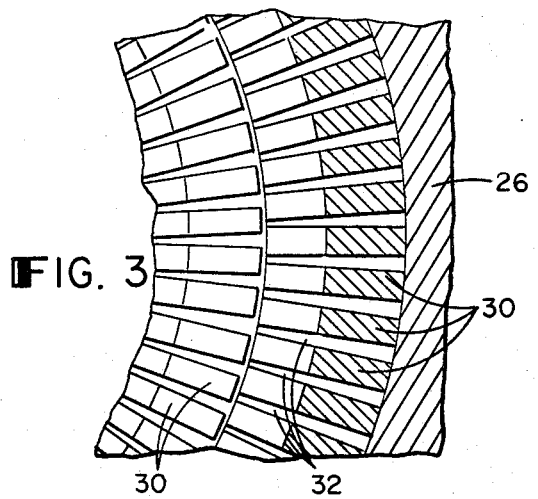
FIG. 3 is a cross-sectional plan taken on the line 3—3 of FIG. 2.
Figure 2:
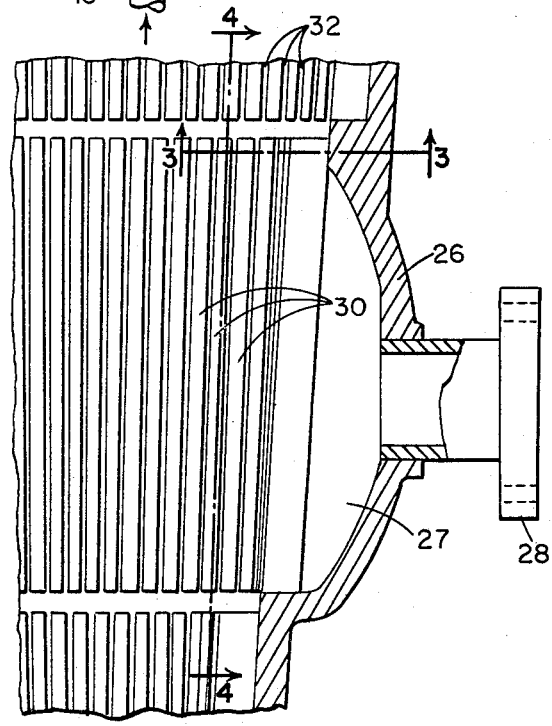
FIG. 2 is an enlarged elevation of a portion of FIG. 1.
Figure 4:
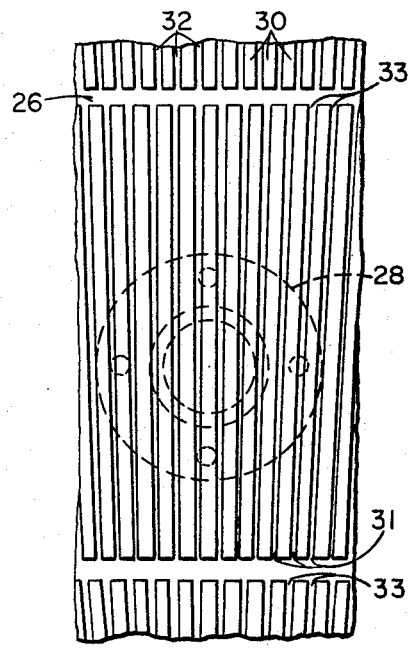
FIG. 4 is a cross-sectional elevation taken on the line 4—4 of FIG. 2.

According to the present invention, however, a stepped series of surrounding outer strainers 16, 17, 18 and 19 are employed in the reaction vessel which has a lower conical imperforate wall portion 22 below the perforate strainer portion and an upper imperforate wall portion 24 above said strainer portion. The vessel walls are bulged outwardly at each strainer to form the outer wall 26 of an annular chamber 27 which includes a pipe 28 for removal of liquid, for example. The perforate wall portion of each strainer defines the inner wall of annular chamber 27 and comprises a plurality of bars 30 extending between said lower and upper wall portions, said bars being radially spaced outward from the axis of the vessel in an increasing magnitude in the downstream direction. The bars 30 are spaced from one another as a band extending entirely around the periphery of the vessel to form a plurality of slots 32 of a width less than that of the size of a wood chip or other solid particle to be separated from the liquid which will pass freely through the slots. Preferably, the bars 30 are straight and of uniform cross section throughout their length, preferably of truncated shape, so that the space between them defining slot width increases in a radial direction outwardly, as best shown in FIG. 3, so that jamming of chips between the bars is decreased. The bars, then, provide a plurality of slots extending longitudinally of the vessel throughout the length of a strainer wall portion and define a generally cylindrical wall portion having a cross-sectional area increasing in a direction from the inlet end to the outlet end. Too, as best shown in FIGS. 2–4, bars 30 have their downstream end edges spaced radially outward of their other end edges, so that they are increasingly spaced from one another and are radially spaced outward from the axis of the vessel in an increasing magnitude in the direction of advance of the solid particles, so that the slots 32 are longitudinally flaring and radially enlarging throughout their entire length, with a maximum slot width 33 greatest at their upper outlet ends adjacent a succeeding strainer wall portion.

It is essential in accordance with the principles of this invention that the inner edges of bars 30 forming the inner faces of succeeding perforate wall portions, that is, the edges toward the axis of the reaction vessel, are positioned radially outwardly with respect to the inner edges of preceding lower wall portions by a distance sufficient to clear the wood chip or other particle. Thus, the bars 30, being generally rectangular in side elevation, are welded to the upper end of lower wall portion 22 and are welded to the lower end of the upper wall portion 24 and to each upwardly succeeding wall portion with their outermost edges in contact therewith, as shown, with their upper ends adjacent the upper wall portion extending inwardly therefrom in a direction perpendicular thereof. By so doing, the succeeding upper wall portions are thereby spaced radially outwardly from the lower wall portions by a distance equal to the thickness of said bars, with the inner edges of said bars diverging upwardly and to each upwardly succeeding wall portion to avoid jamming.

Maximum dimensions of the slots 32 between the bars is about 0.25 inch in width and 2 feet in length, preferably 1 to 1½ feet in length, for wood chips, and less for pulp, say, 0.10 inch in width and 1 foot in length, preferably about 6 to 8 inches in length, with the thickness of the bars in the structure shown herein defining the radial displacement of the upper and lower wall portions and being about ¾ to 2 inches, preferably 1½ inches. If this is compared with a typical wood chip size of ⅟₁₆–⅜ x ⅝–1½ inches in its smallest and largest dimension, it will be seen that such wood chips will be prevented from passing between the bars 30 into chamber 27, and, yet, even if they were to extend into the slot for their maximum dimension, such dimension is still less than the radial displacement of the wall portions. Hence, there is no obstruction to the passage beyond the upper downstream end 33 of the slot of a wood chip in the slot so that, during operation, with wood chips passing upwardly along the slots and the inside faces of the bars, the recessed position of the inner surface of the upper wall portion relatively to the inner edges of the bars 30 will prevent contact of a wood chip with any surface or wall which might tend to obstruct it. The lower ends of the bars must, of course, be spaced less than their upper ends, if bars of uniform cross section are employed, as is preferred, so that the slot spacing 31 at the lower end is not a limiting factor except as it may affect maximum slot width and strainer wall portion length because of the increasing spacing from one another in the direction of advance of the solid particles of bars 30. The degree of spacing is not critical, except that it should be at least about 0.1 degree in order to overcome possible problems due to bars 30 not being straight.

Preferably, inner pipe 14 has a similar series of three stepped strainers 34, 36 and 38, of successively decreasing diameter at its upper portion, said strainers having slots 35, 37 and 39 therein arranged as described above in connection with the outer strainers.

In operation, wood chips, pulp or other particulate material is pumped into the vessel by pump 10 and removed through outlet 12 by discharger 11. During such movement, liquid may be pumped to or from central pipe 14 by pump 13 for radial movement outward or inward through the mass of fibrous material and into one or more of strainers 16, 17, 18, 19, 34, 36 and 38 for movement through pipe 28. A concentric pipe arrangement having an inner pipe 15 for feeding a fluid to the upper inner strainers 36, 38 can be utilized if multiple zone treating is desired, with pipe 14 feeding lower inner strainer 34.

In the second embodiment, referring to FIGS. 5–7, only the wall 110 of the generally upright and generally cylindrical strainer vessel are shown. The strainer vessel, like that of FIG. 1, would ordinarily include a pump for feeding wood chips, pulp, or the like into the bottom thereof and outlet means including a discharger and an outlet pipe for removing pulp from the top, as is shown in the first embodiment.

The strainer vessel has two walls which may be designated as an inner wall 110 and an outer wall 112. The outer wall 112 is shown as dotted lines in FIG. 5. Along with the inner wall 110, the outer wall 112 defines an annular chamber 114 which has an outlet pipe 116. This chamber 114 stores, and the outlet pipe 116 discharges, the liquid that is strained by the inner wall 110 of the vessel. The chamber 114 and pipe 116 are more amply described in the first embodiment.

The inner wall 110 of the generally cylindrical vessel has a plurality of circumferential bands of perforate portions 118 closely axially spaced adjacent one another with relatively axially narrow imperforate portions 117 therebetween.

The perforate portions 118 each consist of a band of narrow, open ended triangular slots 120 extending axially of the vessel as best shown in FIGS. 6 and 7, such slots having been formed by providing T shaped slits in wall portions 118 with the relatively short cross line of the T at the downstream end of its axially extending vertical leg and then bending inwardly the narrow triangular portions of the wall sheet between the ends of the slits. This produces the novel slot elements of the invention with their pairs of narrow triangular projecting walls 122 merging into and integral with the vessel wall along one long generally axially extended edge 121 and defining the slot 120 along the other long generally axially extended edge 124, edge 124 merging into the surface of the vessel wall at the upstream end of slot 120 at the acutely angled point 123 of walls 122 such that the slot 120 at that end is flush with the vessel wall and may be of zero width as shown. The downstream end of slot 120 is open by reason of its wood-chip contacting edges terminating at corner 125, these being positioned inwardly of the vessel wall as provided by the inwardly bent transversely extending short sides 126 of the triangular slot element walls 122. The bottom of the slot end opening is terminated at a short transversely extending edge 128 flush with the vessel wall, so that the entire slot element is free of chip clogging projections such that chips may readily be advanced along and beyond it.

The inner vessel wall 110 is oriented so that the imperforate wall portions 118 slope outwardly, forming an enclosure having a cross-sectional area increasing in a direction from the inlet end to the outlet end. The inner edges 124 of the triangular projecting walls 122 defining slot 120 are generally vertical but at least do not slope radially inwardly in the direction of wood chip movement.

Each of the slots 120 progressively increases in width along its length and has a maximum width at the upper, or downstream end less than that of the size of a wood chip or other solid particle to be separated from the liquid which can pass freely through the slot 120, as defined by the spacing between the triangular projecting walls 122.

Typical maximum dimensions of the slots 120 at their downstream ends are about 0.25 inch in width and 2 feet in length, preferably about 1 to 1½ feet in length, for wood chips, and less for pulp, say 0.10 inch in width and 1 foot in length, preferably about 6 to 8 inches in length, with the maximum radial dimension of the triangular projections 122 of a perforate wall portion 117 defining the radial displacement of imperforate wall portions 118 above and below the perforate wall portion 117, such preferably being about an inch, preferably ¾ inch. If this is compared with a typical wood chip size of 1/16–⅜ x ⅝–1½ inches in its smallest and largest dimension, it will be seen that such wood chips will be prevented from passing through the slots 120 into one of the chambers 114, but will pass freely beyond the open ends thereof.

Since there is no horizontal projection adjacent the upper edge of a slot corresponding to the triangular projecting walls 122 in generally axial planes, there is no obstruction to the passage beyond the upstream end of the triangular projecting walls 122 of wood chips that may be caught between the projecting walls 122. Hence, during operation, with wood chips passing upwardly along the slots 120 and between the projecting walls 122, the position of the downstream imperforate wall portion 118 relative to the triangular projecting walls 122 will prevent contact of a wood chip with any surface of a wall which might tend to obstruct it.

It is important that the inner edges 124 of the triangular projecting walls 122, that is, the edges closest to the axis of the vessel, be positioned radially outwardly with respect to the face of the preceding lower imperforate wall portion 118, so as not to obstruct the free flow of wood chips or solid particles.

The embodiment may include an inner central pipe through which may be pumped liquid for radial movement outward or inward through the mass of fibrous material and through the strainer slots 120 into the chambers 114. This inner pipe may have a series of stepped strainers of successively decreasing diameter at its upper portion with slots as described above in connection with the outer strainer. Such a central pipe and associated inner strainer structure is described more amply in the first embodiment, except, of course, that the bar structure of the first embodiment and not the punched slot structure of this application is therein used.

In operation, as in the first embodiment, wood chips, pulp or other particulate material are pumped into the bottom of the vessel by a pump and are removed from the top through an outlet by a discharger. During such movement, liquid may be pumped to or from the central pipe described above. The central pipe may also have a concentric inner pipe for feeding fluid to the upper portion of the central pipe for the upper strainers surrounding the central pipe as described more fully with respect to the first embodiment.

While I have chosen to illustrate my invention in a generally upright vessel in which the particles move upward, it is equally suited for use in a vessel in which the particles move downward, in which case the entire structure will be inverted. Likewise, the invention may be used in a generally horizontal reaction vessel, or any other, so long as the displacement of the vessel walls before and after the strainer occurs in the correct relationship to the direction of flow, that is, with the downstream end of the slots open.

Thus it will be seen that the structure of the invention provides a novel strainer structure for separation of solid particles, such as wood chips, from a fluid such as a liquid. Various modifications of the invention such as to dimension of the slots and radial displacement in conformance with the size of the solid particles to be separated, within the spirit of the invention and scope of the appended claims will be apparent to those skilled in this art.

What is claimed is:

1. An elongated vessel for treating the solid particle component of a solid particle liquid mixture while said solid particles are advancing from the inlet end of said vessel to the outlet end of said vessel, said vessel having
vessel wall means extending generally throughout the length of said vessel defining an enclosure having sloping walls providing a cross-sectional area increasing in a direction from the inlet end of said vessel to the outlet end of said vessel,
a plurality of circumferential bands of slot elements positioned axially closely adjacent one another, the slots of each said bands extending in an axial direction along said vessel with fluid outlet means for removing said fluid radially outwardly while said solid particles advance therealong from the inlet to the outlet end of said vessel,
said slot elements each having generally axially and radially inwardly projecting side walls integral with said vessel wall means and bent inwardly therefrom, extending radially inwardly from said vessel wall means from a position flush with said vessel wall means at their upstream ends to a maximum at their downstream ends in the direction of advance of said solid particles, each adjacent pair of said side walls providing a pair of spaced inner edges at least not decreasing in radial distance from the axis of the vessel in a direction from the inlet end to the outlet end of said vessel and of increasing spacing from one another in the direction of advance of said solid particles therealong,
providing an elongated, narrow open-ended slot longitudinally flaring throughout its entire length with a maximum width at its end in the direction of the outlet end of said vessel,
the inner edges of each succeeding slot element in a succeeding band in a direction from the inlet to the outlet end of said vessel are spaced radially outwardly of the inner edges of a preceding slot element for unrestricted advance of a solid particle along a slot and from a preceding slot to a succeeding slot.

2. An elongated generally cylindrical vessel for treating the wood chip component of a wood chip-liquid mixture while said wood chips are advancing from the inlet end of said vessel to the outlet end of said vessel, said vessel having
vessel wall means extending generally throughout the length of said vessel defining a generally cylindrical enclosure having sloping walls providing a cross-sectional area increasing in a direction from the inlet end of said vessel to the outlet end of said vessel,
a plurality of slot elements positioned in a circumferential band adjacent one another and extending in an axial direction along said vessel with fluid outlet means for removing said fluid radially outwardly while said wood chips advance therealong from the inlet to the outlet end of said vessel,
said slot elements each having generally axially and radially inwardly projecting side walls integral with said vessel wall means and bent inwardly therefrom, extending radially inwardly from said vessel wall means from a position flush with said vessel wall means at their upstream ends to a maximum of about an inch at their downstream ends in the direction of advance of said wood chips, each adjacent pair of said side walls providing a pair of spaced inner edges at least not decreasing in radial distance from the axis of the vessel in a direction from the inlet end to the outlet end of said vessel of increasing spacing from one another to a maximum of about 0.25 inch in the direction of advance of said wood chips therealong and a maximum length of about 2 feet, a pair of transverse side wall edges at the downstream end of said slot, and a transverse slot terminating edge flush with said wall means, providing an elongated, narrow open-ended slot longitudinally flaring throughout its entire length with a maximum width at its end in the direction of the outlet end of said vessel for unrestricted advance of a wood chip along and beyond a slot.

References Cited

UNITED STATES PATENTS

| 2,661,095 | 12/1953 | Koth | 210—416 X |
|---|---|---|---|
| 2,695,232 | 11/1954 | Richter | 162—251 X |
| 2,998,064 | 8/1961 | Lang | 210—409 X |
| 3,224,358 | 12/1965 | Spielvogel | 210—189 X |

FOREIGN PATENTS 184,653  7/1963  Sweden.

REUBEN FRIEDMAN, *Primary Examiner.*

SAMIH N. ZAHARNA, *Examiner.*

C. DITLOW, *Assistant Examiner.*